(12) United States Patent
Bernsen et al.

(10) Patent No.: US 8,620,137 B2
(45) Date of Patent: *Dec. 31, 2013

(54) METHOD AND APPARATUS FOR DEFINING ENTRY POINT IN A DATA STREAM

(75) Inventors: Johannes Arnoldus Cornelis Bernsen, Eindhoven (NL); Wilhelmus Franciscus Johannes Fontijn, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 843 days.

This patent is subject to a terminal disclaimer.

(21) Appl. No.: 12/495,919

(22) Filed: Jul. 1, 2009

(65) Prior Publication Data

US 2009/0269026 A1   Oct. 29, 2009

Related U.S. Application Data

(63) Continuation of application No. 10/511,971, filed on Oct. 20, 2004, now Pat. No. 7,570,869.

(30) Foreign Application Priority Data

Apr. 25, 2002   (EP) ..................................... 02076645

(51) Int. Cl.
*H04N 9/80* (2006.01)
(52) U.S. Cl.
USPC ...................................................... 386/241
(58) Field of Classification Search
USPC .......................................... 386/241, 243, 324
See application file for complete search history.

(56) References Cited

U.S. PATENT DOCUMENTS

| | | | |
|---|---|---|---|
| 5,363,354 | A | 11/1994 | Tabuchi |
| 5,594,709 | A | 1/1997 | Nagano et al. |
| 6,198,877 | B1 | 3/2001 | Kawamura et al. |
| 6,314,234 | B1 | 11/2001 | Kawamura et al. |
| 6,360,057 | B1 | 3/2002 | Tsumagari et al. |
| 6,377,518 | B1 | 4/2002 | Auwens et al. |
| 6,480,669 | B1 | 11/2002 | Tsumagari et al. |
| 6,643,228 | B1 | 11/2003 | Van Nieuwenhoven |

(Continued)

FOREIGN PATENT DOCUMENTS

| | | |
|---|---|---|
| EP | 1039756 A2 | 9/2000 |
| EP | 1061522 A2 | 12/2000 |

(Continued)

OTHER PUBLICATIONS

Ueda, Machine generated translation of JP 2000-358218, Dec. 2000.*

*Primary Examiner* — David Harvey (57) ABSTRACT

The invention relates to a method and an apparatus for defining entry points for a data stream, in particular a stream of audiovisual information. Entry points in the stream are defined at a predetermined interval. This may be a time interval, a byte interval or any other interval. It is an object of the invention to provide an entry point table having a limited size. This object is achieved by increasing the interval between entry points if the table exceeds a predetermined size. This size may be defined in bytes, in the number of entry points or even in the number of sub-tables. After redefinition of the interval between entry points, entry points are redefined. The invention also relates to an apparatus for defining the entry points and to a record carrier with a data stream incorporating entry points defined by the method according to the invention.

21 Claims, 10 Drawing Sheets

(56) References Cited

U.S. PATENT DOCUMENTS

| | | | |
|---|---|---|---|
| 6,801,712 B1 * | 10/2004 | Yokouchi | 386/241 |
| 7,159,244 B2 | 1/2007 | Matsushima et al. | |
| 7,570,869 B2 * | 8/2009 | Bernsen et al. | 386/241 |
| 2004/0175146 A1 * | 9/2004 | Tsumagari et al. | 386/95 |

FOREIGN PATENT DOCUMENTS

| | | |
|---|---|---|
| EP | 1051027 B1 | 5/2006 |
| GB | 2359439 A | 8/2001 |
| JP | 2000322875 A | 11/2000 |
| JP | 2000358218 A | 12/2000 |
| JP | 2001086462 A | 3/2001 |

* cited by examiner

METHOD AND APPARATUS FOR DEFINING ENTRY POINT IN A DATA STREAM

This application claims the benefit or priority of and describes the relationships between the following applications: wherein this application is a continuation of U.S. patent application Ser. No. 10/511,971, filed Oct. 20, 2004,(now U.S. Pat. No. 7,570,869 issued Aug. 4, 2009), which is the National Stage of International Application No. PCT/IB2003/001312, filed Apr. 1, 2003, which claims priority of foreign application EPO 02076645.7, filed Apr. 25, 2002.

This is a continuation of prior application Ser. No. 10/511,971 filed Oct. 20, 2004 and is incorporated by reference herein.

The invention relates to a method of defining entry points in a stream of audiovisual information in an entry point table, in which the entry points are defined at a first predetermined first time interval.

The invention also relates to a record carrier comprising a data stream.

The invention also relates to a record carrier comprising computer-readable and executable instructions.

The invention further relates to an apparatus adapted to define entry points in an incoming data stream.

The invention further relates to an apparatus for reproducing information.

An embodiment of such a method is known to those skilled in the art. In order to navigate through a stream of audiovisual information and start the reproduction of the audiovisual information at arbitrary points, it is necessary to fix points where desired information can be found. If a user wants to jump forward, for example, 10 seconds during reproduction of the stream of audiovisual information so as to continue the reproduction from that point, it should be known which point in the stream of audiovisual information corresponds to "10 seconds forward".

The points indicating where the requested information can be searched are entry points which are stored in an entry point table. Generally, the entry points are defined at a fixed distance with respect to time in the stream of audiovisual information. The temporal distances are fixed and, consequently, also when reproducing the data stream. This method has the drawback that the entry point table for the stream of audiovisual information is large when a very long stream of audiovisual information is concerned, while the fixed distance between the entry points is relatively small. A small distance between two entry points is generally preferred because this facilitates the search possibilities in the data stream. Since the individual streams of audiovisual information on a record carrier with audiovisual information such as, for example, on many compact discs with contemporary music are generally relatively short, approximately 5 minutes, it will not often occur that a stream of audiovisual information covers, for example, three quarters of an hour.

During reproduction of the steam of audiovisual information, the entry point table is temporarily stored in a working memory of a playback apparatus. Consequently, the working memory should have a capacity which is large enough to store the entry point table.

This poses a dilemma to a designer of the playback apparatus. The designer may choose to dimension the capacity of the working memory of the playback apparatus in such a way that streams of audiovisual information of maximally ten minutes can be reproduced. In this way, costs of the working memory can be saved. However, not all streams of audiovisual information can then be reproduced.

The designer of the apparatus may also choose to dimension the capacity of the memory in such a way that streams of audiovisual information of any possible length can be played on the apparatus with entry point tables of any possible length. However, this means that a large part of the memory remains unused when reproducing many streams of audiovisual information. The reason is that small streams of audiovisual information, recorded by means of the known method, have a small entry point table which requires a small memory space.

It is an object of the invention to provide an entry point table which does not exceed a predetermined size.

According to the invention, this object is achieved by means of the method according to the invention, which method comprises the steps of: generating an entry point table; defining a first interval; defining entry points in the incoming data stream, in which the entry points are defined at an equal distance from each other, equal to the first interval; storing the defined entry points in the entry point table; if the size of the entry point table exceeds a predetermined maximum size, increasing the first interval between the entry points to a second interval; and, if the size of the entry point table exceeds the predetermined maximum size, determining new entry points having a mutual distance which is equal to that of the second predetermined interval.

In this way, the entry point table will never exceed a predetermined size. This is a great advantage because a designer of an apparatus which is to execute the method according to the invention can then take into account that the entry point table will not exceed a given size. Consequently, resources in the apparatus can be designed efficiently.

Moreover, the method according to the invention provides flexibility in defining entry points in a data stream if the length of the data stream is not known in advance. If the length of the data stream is known in advance, the time interval between the different entry points can be chosen to be such that the size of the entry point table associated with the data stream will not exceed a predetermined size. If the length of the data stream is unknown at the start of a recording session, it is not possible to choose the correct time interval. This problem is also obviated by the method according to the invention.

In an embodiment of the method according to the invention, the second interval is chosen to be twice as large as the first predetermined interval.

This embodiment has the advantage that at the instant when new entry points must be defined because the entry point table exceeds a predetermined size, half of the entry points already defined can be re-used. Moreover, it is not necessary to define new entry points for the part of the data stream for which entry points have already been defined, which is also a great advantage, notably in the case of large data streams.

In an embodiment of the method according to the invention, the maximum size of the entry point table is determined by the number of entry points.

This embodiment has the advantage that it is known in advance how many entry points should be maximally processed by the processing unit or units of the apparatus, possibly already when designing an apparatus which is adapted to reproduce a data stream for which entry points have been defined in accordance with this embodiment.

In an embodiment of the method according to the invention, the maximum size of the entry point table is determined by its total size.

This embodiment has the advantage that it is known in advance how much memory space should be allocated for temporary storage of the entry point table, possibly already when designing an apparatus which is adapted to reproduce a data stream for which entry points have been defined in accordance with this embodiment.

An embodiment of the method according to the invention relates to a method of splitting up a first data stream into a second data stream comprising the start of the first data stream, and a third data stream comprising the end of the first data stream, and is characterized in that a table with a first group of entry points is defined for the first data stream by means of the method as defined in claim 1, which method comprises the steps of: selecting a second group of entry points from the first group of entry points, in which the second group of entry points refers to locations in the second data stream; forming a second entry point table comprising the second group of entry points; selecting a third group of entry points from the first group of entry points, in which the third group of entry points refers to locations in the third data stream; forming a third entry point table comprising the third group of entry points; determining an interval between the start of the third stream of audiovisual information and a first entry point of the third data stream; and storing the interval, determined in the previous step, in the third entry point table.

This method has the advantage that the entry points which have already been defined for the first data stream can be re-used as entry points for the second data stream and the third data stream.

An embodiment of the method according to the invention relates to a method of combining a first data stream and a second data stream to a third data stream, and is characterized in that entry points are defined for each stream by means of the method as defined in claim 1, the method comprising the step of combining: a first entry point table, associated with the first data stream, and a second entry point table, associated with the second data stream, for forming a third entry point table associated with the third data stream.

This method has the advantage that the entry points which have already been defined for the first data stream and the second data stream can be re-used as entry points for the third data stream.

According to the invention, the record carrier comprises a data stream in which the stream of audiovisual information comprises entry points as defined by the method of claim 1.

The record carrier comprises computer-readable and executable instructions enabling the computer to perform the method defined in claim 1.

The apparatus adapted to define entry points in an incoming data stream is further adapted to generate an entry point table; define a first interval; define entry points in the incoming data stream, in which the entry points are defined at an equal distance from each other, equal to the first interval; store the defined entry points in the entry point table; if the size of the entry point table exceeds a predetermined maximum size, increase the first interval between the entry points to a second interval; and, if the size of the entry point table exceeds a predetermined maximum size, determine new entry points having a mutual distance which is equal to that of the second predetermined interval.

The apparatus for reproducing information is adapted to read a data stream from a record carrier as defined in claim 8 and reproduce the information which has been read.

These and other aspects of the invention are apparent from and will be elucidated with reference to the embodiments described hereinafter.

Figure 1:
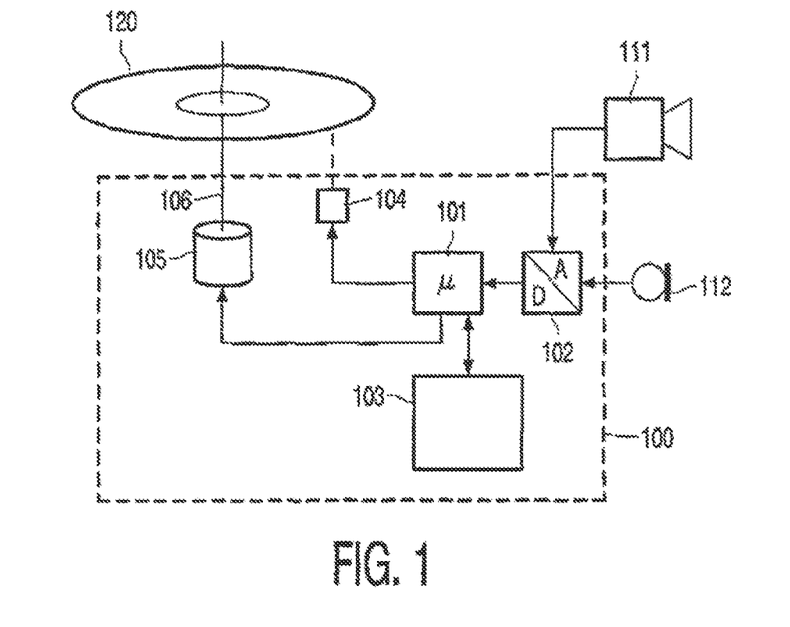
FIG. 1 shows a device for performing an embodiment of the method according to the invention.

FIG. 1 shows a device 100 as an embodiment of the invention for recording a data stream on a record carrier 120. In the embodiment shown, the record carrier 120 is an optical disc, but it will be evident to those skilled in the art that this may be alternatively a hard disc, a Flash EEPROM or any other record carrier. The data stream may be a stream of audiovisual information. It will of course be evident to those skilled in the art that audiovisual information is herein understood to mean that the data stream may comprise either audio information, or video information or a combination of both. The data stream may also comprise data files. These data files may comprise subtitles in video information, still images or computer-executable instructions. This is irrelevant to the scope of the invention.

The device 100 comprises a processing unit 101, an A/D converter (ADC) 102, a memory 103, a writing unit 104 and a motor 105 with a shaft 106 which, when in use, causes the record carrier 120 to rotate. A camera 111 and a microphone 112 are coupled to the device 100. The camera 111 and the microphone 112 record audiovisual information from the ambience and convert it into electric signals. These electric signals are passed on to the ADC 102. The ADC 102 converts the signals from the camera 111 and the microphone 112 into digital signals if the signals from the camera 111 and the microphone 112 are analog signals. The digital signals generated in this way are passed on as a stream of audiovisual information to the processing unit 101. Information to be written on the record carrier 120 may, however, also be digital and in that case this information is directly passed on to the processing unit 101.

The central processing unit defines entry points in the stream of audiovisual information at fixed distances in the playback time of the stream of audiovisual information and passes the stream of audiovisual information to a writing unit 104 writing the stream of audiovisual information on the record carrier 120.

The location of the entry points in the stream of audiovisual information can be given by entry point addresses. The entry point addresses comprise information about the byte location of associated entry points in the stream of audiovisual information on the record carrier 120. In this description of embodiments of the invention, both the entry point addresses and the entry points themselves will be referred to as entry points. If a reference numeral in the Figures refers to a location in an entry point table, the object to which reference is made is an entry point address. If a reference numeral refers to a location in a data stream, the object to which reference is made is an entry point. Entry point addresses and corresponding entry points are denoted by the same reference numeral.

When a stream of audiovisual information is being written on the record carrier 120, the entry points are temporarily stored in the memory 103. After the stream of audiovisual information has been written, a table is formed with the entry points and this table is stored on the record carrier 120.

It should be noted that there are three ways of referring to the location of given information, namely the physical location such as internally used by the drive, the logic location as used by the host and the location in the byte stream as used by an application. In the description of the embodiments, the last-mentioned way of reference will be used. However, the invention is not limited thereto.

Figure 2:
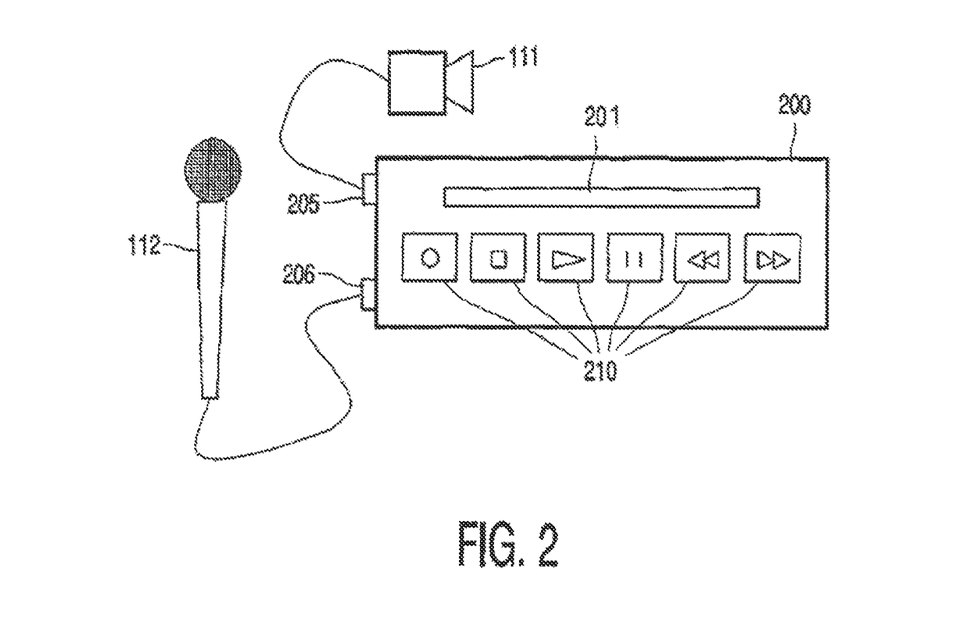
FIG. 2 shows an embodiment of the recording apparatus according to the invention.

FIG. 2 shows an apparatus 200 as an embodiment of the apparatus according to the invention. The device 100 (FIG. 1) is built in the apparatus 200. Apparatus 200 has an opening 201 for introducing the record carrier 120, a connection 205 for the camera, a connection 206 for the microphone 112 and keys 210 for operating the apparatus 200.

If a very large stream of audiovisual information is to be recorded by means of the device 100, the table comprising the entry points, the entry point table, may become very long for the stream of audiovisual information. In any case, the maximum size of the entry point table is not known in advance so that it is not known how much memory should be allocated for the entry point table. The invention provides a method of defining entry points in such a way that the entry point table does not exceed a predetermined size. This also has the advantage that the entry point table occupies less memory space on the record carrier 120 and that a further processing unit of a playback apparatus does not need to process too much information. The latter may jeopardize the real-time performance of playing back the stream of audiovisual information.

Figure 3:
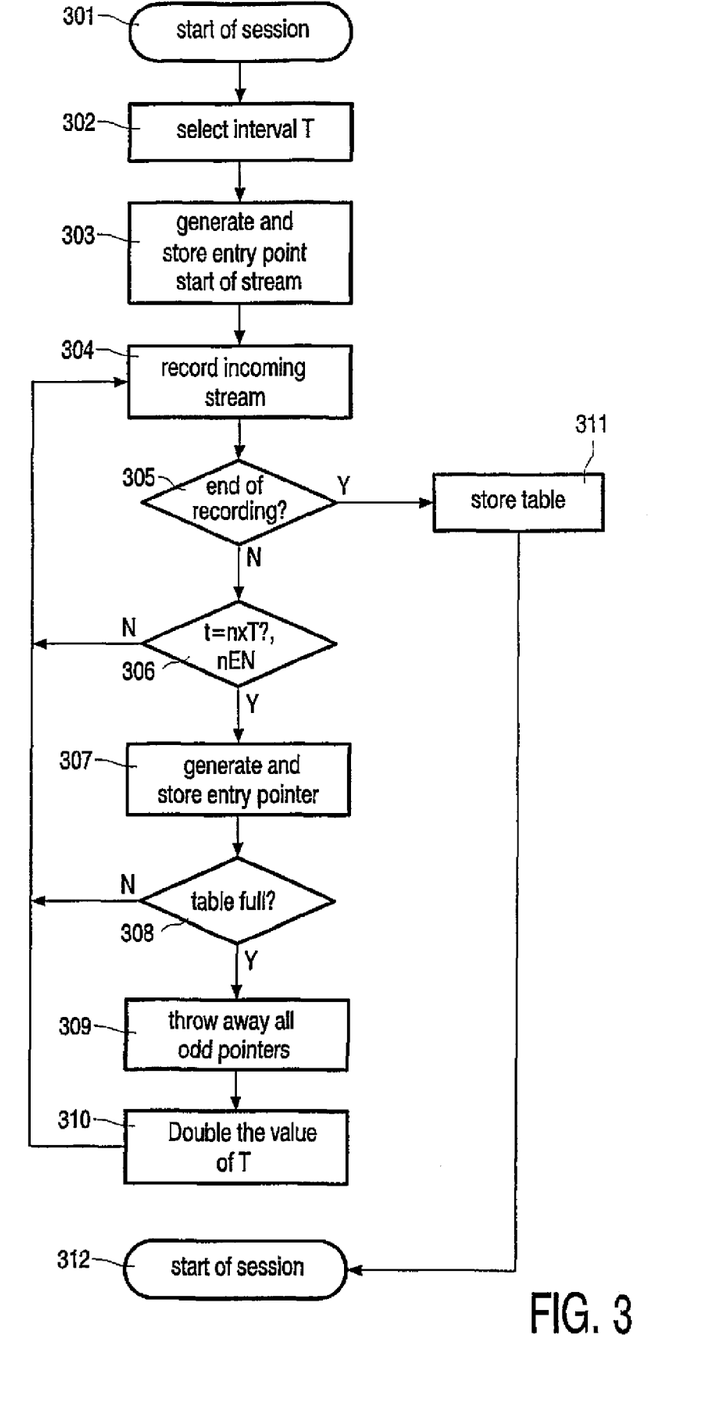
FIG. 3 shows an embodiment of the method according to the invention.

A flow chart 300 in FIG. 3 shows an embodiment of the method according to the invention for generating an entry point table for a stream of audiovisual information when this stream is being written on a record carrier. The flow chart 300 will be described in combination with FIGS. 4A, 4B, 4C and 4D. The method is performed by the processing unit 101 (FIG. 1), but is not limited thereto.

The method shown in flow chart 300 starts at starting point 301 with a recording session. In a process step 302, a time interval T is selected, which is the interval between two juxtaposed entry points. The initial time interval T is preferably as small as possible, equaling the smallest data unit that can be defined. In MPEG-2 this is, for example, a GOP (Group Of Pictures). In a process step 303, the first entry point is defined as the starting point of a stream of audiovisual information. Subsequently, a start is made in a process step 304 with the recording of the stream of audiovisual information on a record carrier.

Since the process step 304 is the start of a loop, it is checked after the process step 304 in a process step 305 whether the recording of the stream is stopped. If this is the case, the entry point table 400 is stored in a process step 311 and the method of the flow chart 300 ends with the terminating step 312.

However, if the process step 305 does not detect a stop of the recording process, it is checked in a process step 306 whether the duration of the stream of audiovisual information that has already been recorded is a multiple of the time interval T. If this is not the case, the flow chart 300 returns to the process step 304 and the stream of audiovisual information is further recorded. However, if the duration of the stream of audiovisual information that has already been recorded does correspond to a multiple of the time interval T, a subsequent entry point referring to position 401 in the stream of audiovisual information 420 already recorded is created in a process step 307. This entry point referring to position 401 is stored in the entry point table 400.

After the entry point has been defined and stored in the entry point table 400, it is checked in process step 308 whether the entry point table 400 is larger than or equal to a predetermined value. In the example given in FIGS. 4A, 4B, 4C and 4D, the single entry point table may comprise a maximum number of 8 entry points, including the entry point for the start of the stream of audiovisual information.

Figure 4A:
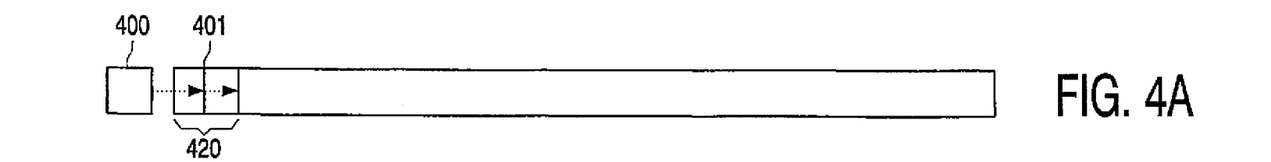
FIGS. 4A, 4B, 4C and 4D show data streams to illustrate an embodiment of the method according to the invention.
Figure 4B:
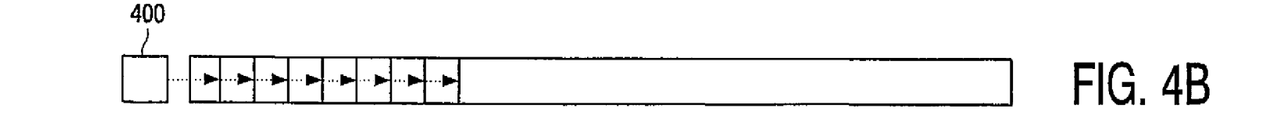
Figure 4C:
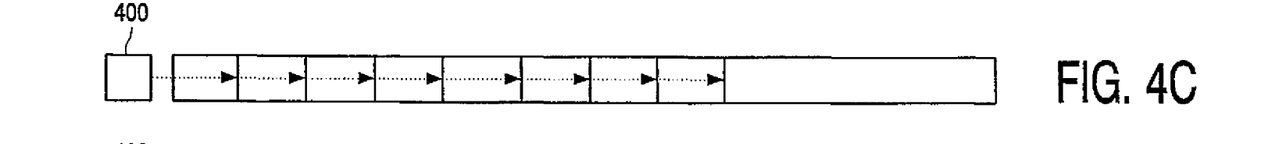
Figure 4D:
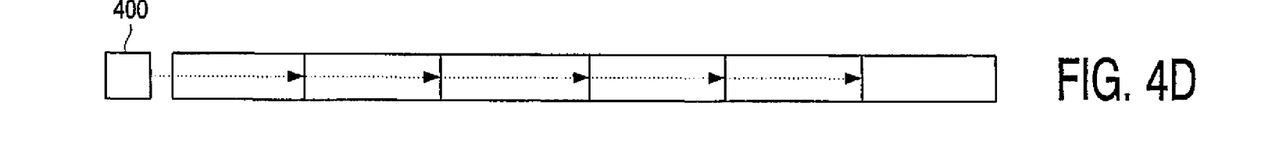

If the entry point table 400 does not exceed the predetermined size, the flow chart 300 returns, after the process step 308, to the process step 304 for recording the incoming stream of audiovisual information. If the size of the entry point table 400 is larger than or equal to a predetermined value, all odd entry points are removed from the entry point table 400 in a process step 309 in accordance with an embodiment of the invention. Subsequently, the time interval T is doubled in a process step 410. This is illustrated in FIGS. 4B, 4C and 4D.

After the process step 309, the flow chart 300 returns to the process step 304 and the incoming stream of audiovisual information is further recorded. The flow chart 300 is run through in this way until, as previously stated, it is detected in the process step 305 that the recording of the stream of audiovisual information is stopped.

Figure 5:
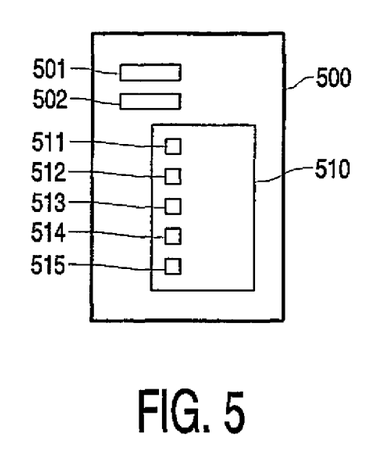
FIG. 5 shows an entry point table generated by means of an embodiment of the method according to the invention.

FIG. 5 shows a structure of an entry point table 500. The entry point table 500 comprises a counter 501 indicating the number of entry points in the entry point table 500. The entry point table 500 also comprises an interval indicator 502 indicating the length of the interval between two entry points. Furthermore, the entry point table comprises a sub-table 510 with entry points 511, 512, 513, 514 and 515. Strictly speaking, these entry points are addresses of entry points, but for the sake of simplicity they will be further referred to as entry points, as previously stated in this description. The entry points comprise information relating to the location of the corresponding information in a stream of audiovisual information associated with the entry point table 500. The entry points in the table 500 thus refer to locations in the associated stream of audiovisual information. Furthermore, the entry points comprise information relating to the instant when the reproduction of the stream of audiovisual information indicates the entry point in relation to the start of reproducing the stream of audiovisual information.

After the stream of audiovisual information has been stored and entry points have been defined by means of the method according to the invention, there may be a need to process the stored streams of audiovisual information. This processing means that a user wants to split up a stream of audiovisual information or combine two or more streams of audiovisual information. Since intervals between different entry points of the different streams are not necessarily the same, it is not trivial to perform processing operations on the streams of audiovisual information that have been stored and defined with entry points by means of the method according to the invention.

For this reason, an embodiment of the method according to the invention provides the possibility of splitting up the streams of audiovisual information created in accordance with flow chart 300. This will be further explained with reference to FIGS. 6A, 6B and 6C. These figures show a first stream of audiovisual information 600 with a first entry point table 601 which is split up at a position 605 into a second stream of audiovisual information 630 with a second entry point table 631 and a third stream of audiovisual information 660 with a third entry point table 661. The first entry point table 601 is split up and entry points of the first entry point table 601 are incorporated in the second entry point table 631 and the third entry point table 661. The standard interval between two entry points, denoted by interval 609, is equal to all of the three streams.

Figure 6A:
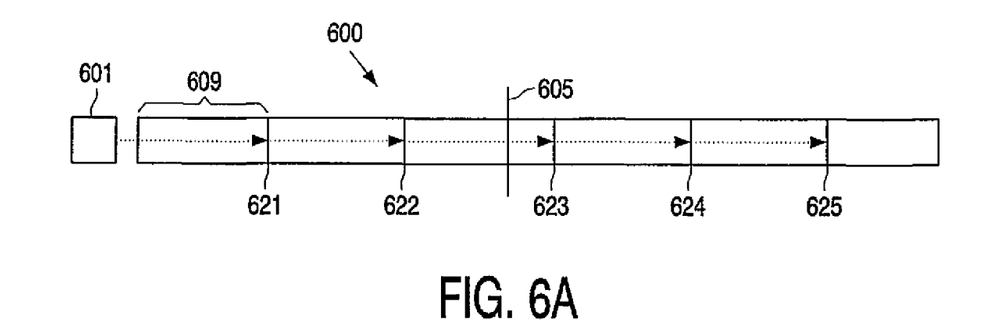
FIGS. 6A, 6B and 6C show three data streams to illustrate an embodiment of the method according to the invention, and the associated entry point tables.
Figure 6B:
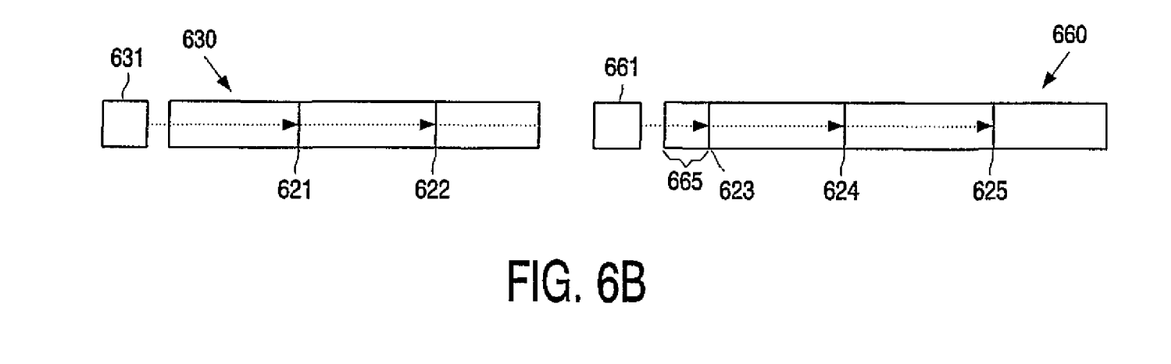
Figure 6C:
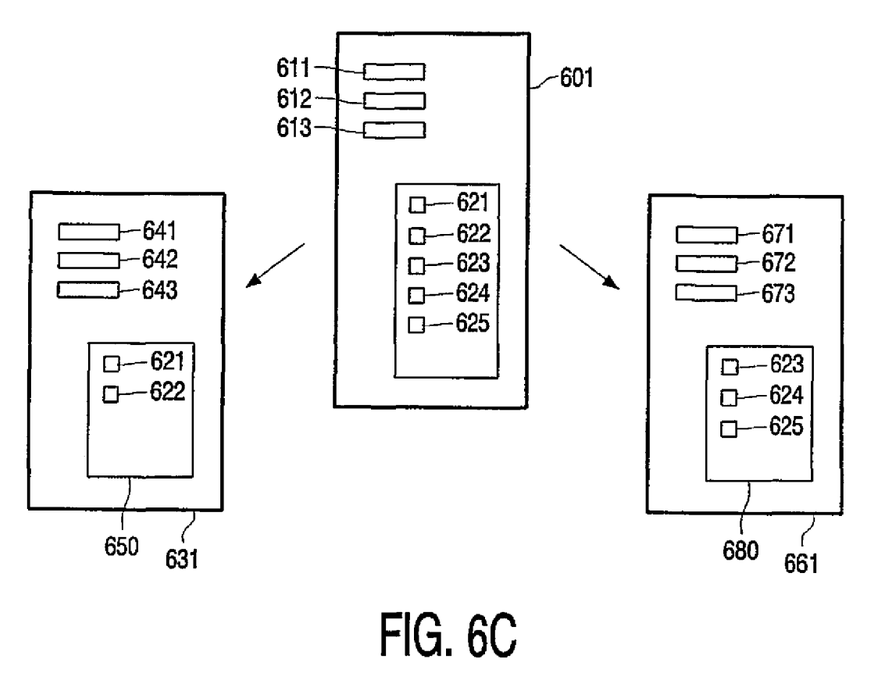

When splitting up the first stream of audiovisual information 600, the problem presents itself that the distance between the start of the third stream of audiovisual information 661 and the entry point 623, denoted by the interval 665, may be smaller than the interval 609. To solve this problem, an extra parameter is added to the first entry point table 601, the second entry point table 631 and the third entry point table 661. This extra parameter is the duration of the first interval of the stream of audiovisual information, the interval between the start of the stream of audiovisual information and the first entry point of the stream of audiovisual information.

FIG. 6C shows that this parameter is indicated as a first start interval indicator 613 in the first entry point table 601, as a second start interval indicator 643 in the second entry point table 631 and as a third start interval indicator 673 in the third entry point table 631. The duration of the third start interval 673 is denoted by the interval 665 in FIG. 6B. It will be evident to those skilled in the art that the first start interval indicator 613 in the first entry point table 601 is not necessary because the first interval of the first stream of audiovisual information 601 is just as large as the rest of the intervals between entry points in the first stream of audiovisual information 600.

FIG. 6C further shows that the entry points in the first sub-table 620 of the first entry point table 601 are spread across the second sub-table 650 of the second entry point table 631 and the third sub-table 680 of the third entry point table 661.

An embodiment of the method according to the invention provides the possibility of combining streams of audiovisual information created in accordance with flow chart 300 to one stream. This will be further explained with reference to FIGS. 7A, 7B and 7C.

Figure 7A:
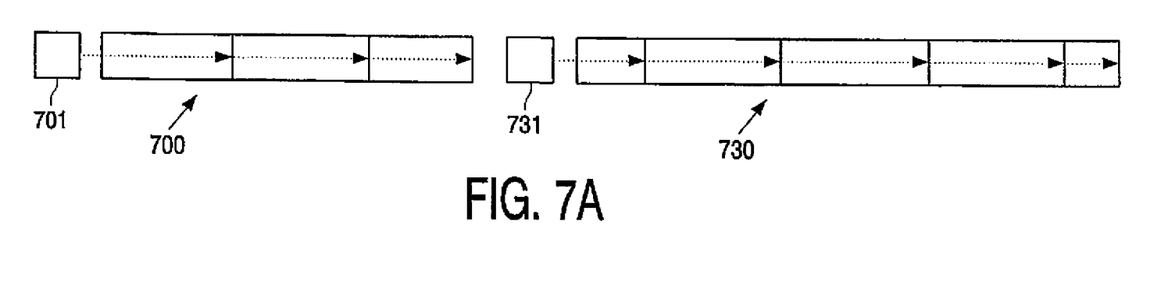
FIGS. 7A, 7B and 7C show three data streams to illustrate an embodiment of the method according to the invention, and the associated entry point tables.
Figure 7B:
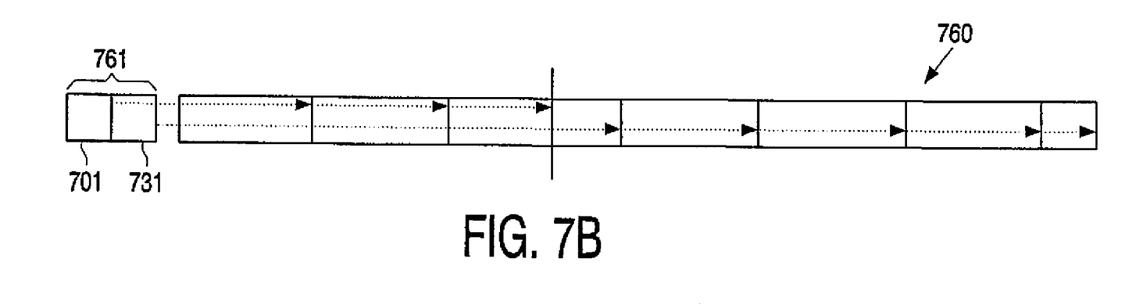
Figure 7C:
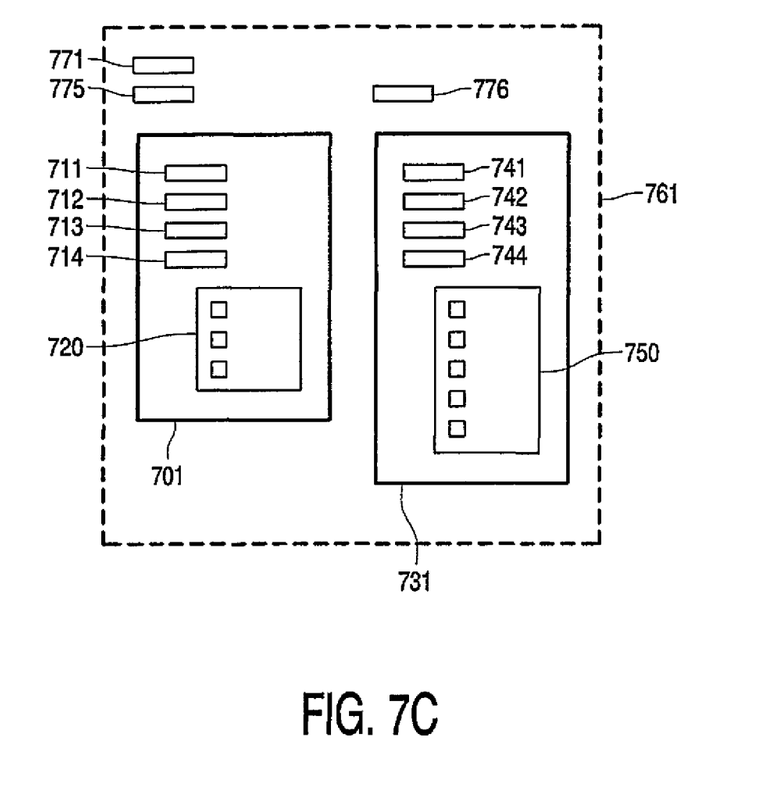

FIG. 7A shows a first stream of audiovisual information 700 with a first entry point table 701 and a second stream of audiovisual information 730 with a second entry point table 731. These two streams of audiovisual information are combined to a third stream of audiovisual information 760 with a third entry point table 761, as is shown in FIG. 7B. The third entry point table 761 is formed by combining the first entry point table 701 and the second entry point table 731, which is shown in FIG. 7C.

To support the combination of two streams of audiovisual information as shown in FIGS. 7A and 7B, the standard entry point table 500 shown in FIG. 5 is extended by two extra parameters in addition to the parameters already known. These known parameters of the first entry point table 701 are a first counter 711 indicating the number of entry points in the first entry point table 701, and a first interval indicator 712 indicating the interval between two entry points. The two parameters, which are new with respect to the standard entry point table 500, are a first start interval indicator 713 and a first end interval indicator 714. Furthermore, the first entry point table 701 comprises a first sub-table 720 with references to entry points. The second entry point table 731 comprises elements which are equal to those in the first entry point table 701. The functions of the extra parameters will be apparent from the following description.

To combine the first stream of audiovisual information 700 and the second stream of audiovisual information 730 to the third stream of audiovisual information 760, the first entry point table 701 and the second entry point table 731 are combined to the third entry point table 761, as described hereinbefore. In this way, the third entry point table 761 comprises two sub-tables which are formed by the first entry point table 701 and the second entry point table 731. Furthermore, the third entry point table 761 comprises a third counter 771 indicating the number of sub-tables in the third entry point table 761. Moreover, the third entry point table 761 comprises a first table length indicator 775 for indicating the length of the first entry point table 701, and a second table length indicator 776 for indicating the length of the second entry point table 731. The table length indicators may also comprise addresses of the location of the sub-tables in a combined entry point table. If the third stream of audiovisual information is combined with a plurality of further streams of audiovisual information, a further entry point table is created, which comprises a plurality of entry point tables as sub-tables.

The three references to entry points in the first sub-table 720 of the first entry point table 701 refer to entry points in the first part of the third stream of audiovisual information 760. As is shown in the Figure, the last interval of the first stream of audiovisual information is smaller than the standard interval. To be able to refer satisfactorily to the start of the second stream of audiovisual information 730 in the third stream of audiovisual information 760 after the combining action, the first end interval indicator 714 is incorporated in the first entry point table 701.

In the example shown in FIG. 7A, the start interval of the second stream of audiovisual information 730 is also smaller than the standard interval of the second stream of audiovisual information 730. To be able to refer satisfactorily to the first entry point of the second stream of audiovisual information 730 in the third stream of audiovisual information 760, the second entry point table 731 incorporates a second start interval indicator 743.

For reasons of compatibility, the first start interval indicator 713 is incorporated in the first entry point table 701 and a second end interval indicator 744 is incorporated in the second entry point table 731.

A combined entry point table is thus obtained in the manner presented as an embodiment of the method of combining two streams of audiovisual information. Entry point tables can be combined until an entry point table is obtained which is larger than a predetermined maximum size. This maximum size can be defined by the number of sub-tables of the entry point table, the size of the entry point table in bytes or by the number of entry points of the entry point table.

If the entry point table exceeds a predetermined size, the entry points of the combined stream of audiovisual information should be redefined in accordance with an embodiment of the invention. In accordance with a further embodiment of the invention, the number of entry points in the sub-tables of the combined entry point table can be halved in accordance with the method described with reference to FIG. 3.

Different embodiments of the entry point table have thus been presented, with a different number of parameters. Dependent on the need, a user of the invention may choose the embodiment shown in FIG. 5, FIG. 6C or FIG. 7C, or combinations of these embodiments.

FIGS. 8A, 8B, 8C, 8D and 8E show embodiments of the invention as variants of the embodiments shown in FIGS. 3, 4A, 4B, 4C and 4D. If an entry point table is filled in accordance with the method described with reference to FIG. 3, 50% to 100% in the entry point table is filled. This does not always result in an optimal situation. To optimize the situation, the interval between two entry points is not doubled but increased by, for example, 50% if the entry point table exceeds a predetermined value.

Figure 8A:
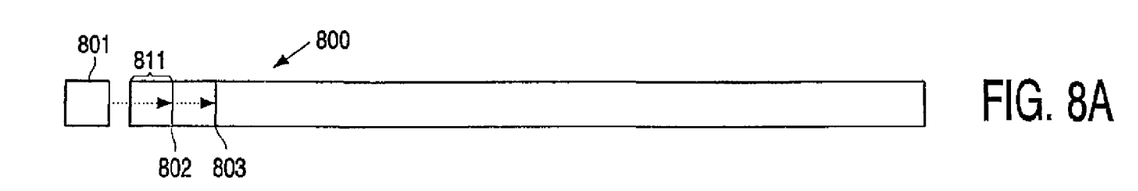
FIGS. 8A, 8B, 8C, 8D and 8E show data streams to illustrate a further embodiment of the method according to the invention.
Figure 8B:
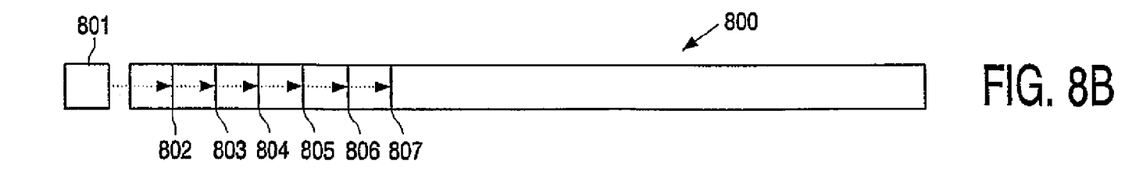
Figure 8C:
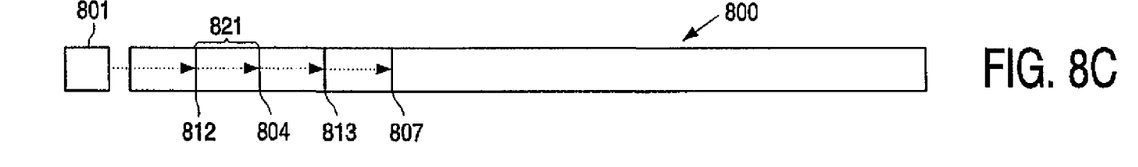
Figure 8D:
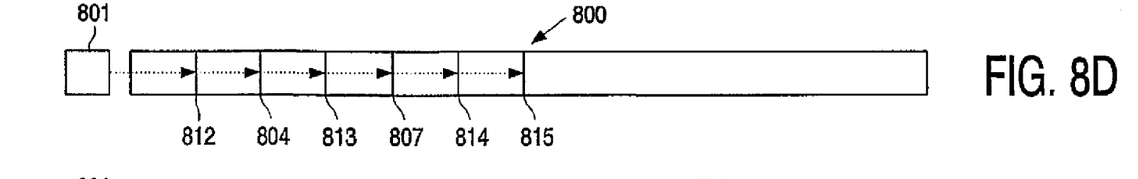
Figure 8E:
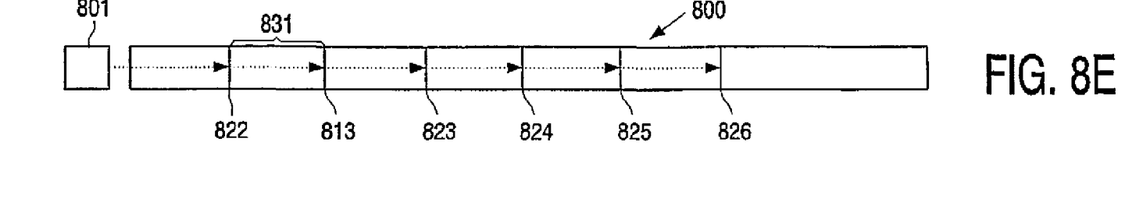

FIG. 8A shows a stream of audiovisual information 800 which is recorded in accordance with a method as an embodiment of the invention, using an entry point table 801 and two entry points, with a mutual distance of the first interval 811. In the example shown in FIGS. 8A, 8B, 8C, 8D and 8E, the entry point table 801 has the maximum size when it comprises six entry points. FIG. 8B shows the stream of audiovisual information when it has further been recorded and has six entry points. Since six is the maximum number of entry points, entry points are defined again in order that the interval between two entry points is 50% larger than the interval in FIG. 8A. To prevent the entry points from being completely redefined, the entry points may already be stored in a memory when a previous part of the stream of audiovisual information is being recorded. Consequently, the entry points do not need to be redefined. This is a great advantage because it is necessary to work one's way through the entire stream of audiovisual information 800 if the entry points are to be (re)defined.

Moreover, a number of entry points may be re-used anyway when redefining the interval between two entry points. This will be evident when comparing FIGS. 8B and 8C: entry point 804 may be used both before and after redefinition of the stream of audiovisual information.

Entry points are denoted by reference numerals in FIGS. 8A, 8B, 8C, 8D and 8E. This has been done to indicate in how far previously defined entry points can be re-used in a later stage of the recording process.

In this way, 66% to 100% of the entry point table 801 has been filled.

Figure 9A:
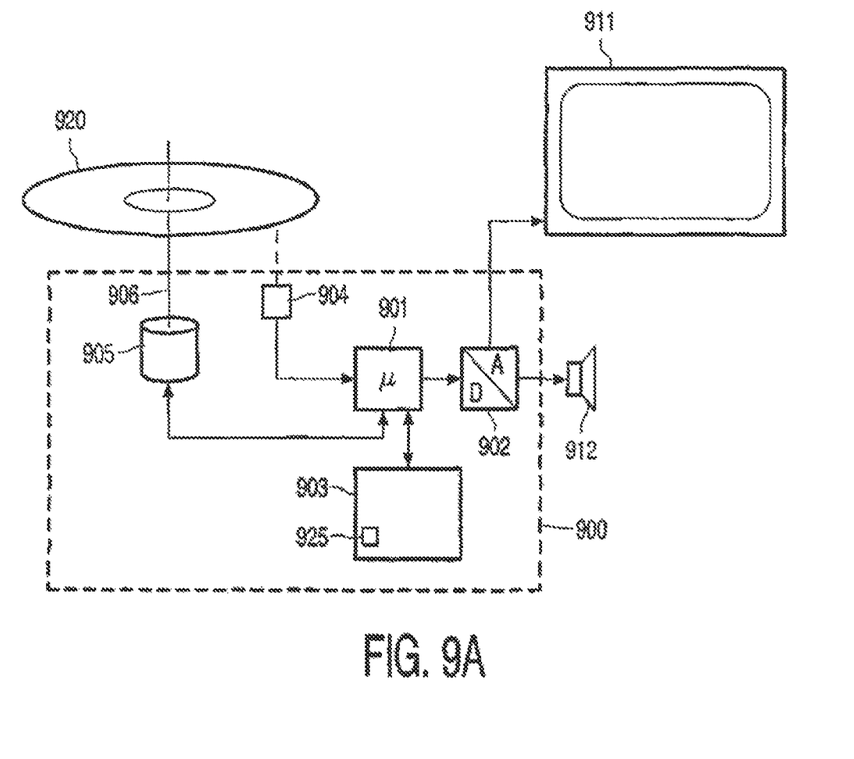
FIGS. 9A and 9B show an embodiment of a device for playing back the record carrier comprising a data stream with entry points which have been defined by means of the method according to the invention, and the playback apparatus according to the invention.
Figure 9B:
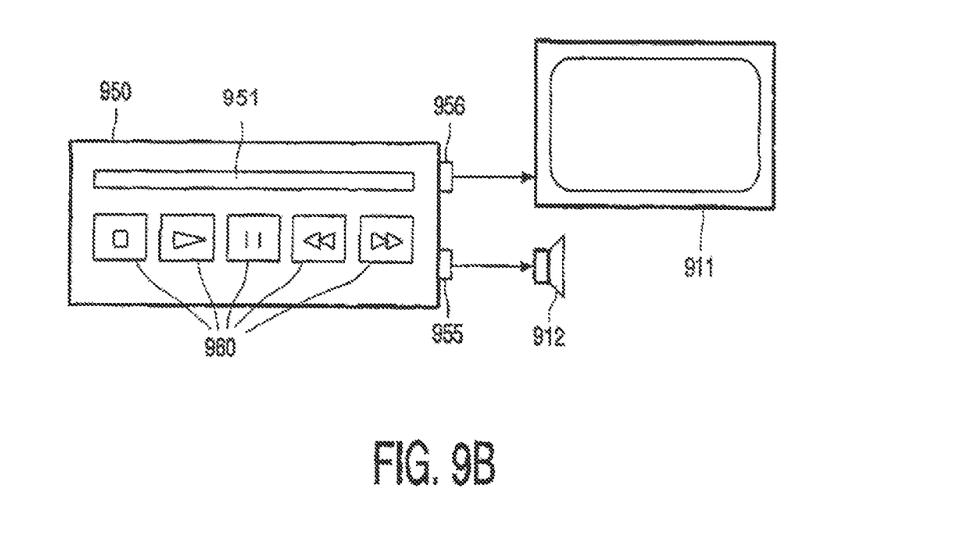

FIG. 9A shows a circuit 900 for playing back a record carrier on which information has been stored by means of the method according to the invention. FIG. 9B shows an apparatus 950 as an embodiment of the playback apparatus according to the invention. The apparatus 950 comprises the circuit 900.

The circuit 900 comprises an optical pick-up unit 904 for reading information from a record carrier 920, which information is stored on the record carrier 920 by means of the method according to the invention. The information read from the record carrier 920 is passed on to a processing unit 901. The processing unit 901 can send the data directly to a D/A converter (DAC) 902. The processing unit can also further process the information from the optical pick-up unit before sending it to the DAC 902. This may be, for example, decompression or restoring errors that have occurred when reading information from the record carrier 920. The information is sent in an analog form from the DAC 902 to a reproduction device for reproduction. In the presented embodiment, the reproduction device comprises a display screen 911 and a loudspeaker 912. It will be evident to those skilled in the art that the reproduction device may alternatively comprise one of both.

In addition to the circuit 900, the playback apparatus 950 has an opening 951 for introducing a record carrier, keys 960 for operating the apparatus 950 and a first connection for coupling the display screen 911 to the apparatus 950 and a second connection for coupling the loudspeaker 912 to the apparatus 950.

The keys 960 enable a user of the apparatus 950 to navigate through the information displayed on the display screen 911 and reproduced via the loudspeaker. Before displaying a stream of audiovisual information, an entry point table associated with the stream of audiovisual information is stored in a memory 903 of the circuit 900. Since the entry point table does not exceed a predetermined value, a fixed quantity of space 925 can be allocated in the memory 903. This has the advantage that a possible buffer overflow is prevented in this way and that it is clearly known how much space in the memory 903 is available for further applications of the apparatus 950.

When the user navigates through the stream of audiovisual information by means of the keys 960 and makes use of the fast-forward option, the optical pick-up unit 904 jumps from entry point to entry point in the stream of audiovisual information. This is done by reading the entry points of the entry point table from the memory. The processing unit 901 can find the locations of the entry points on the record carrier 920 by means of the position of a shaft 906 which sets the record carrier 920 in motion and by feedback of a motor 905 which drives the shaft 906 and is coupled to the processing unit 901, and by means of the position of the optical pick-up unit 904. This enables the user to navigate through the stream of audiovisual information.

It will be evident to those skilled in the art that the description of the invention is not limitative and that several variations are possible. For example, it is also possible to add an extra reference to the start of the stream of audiovisual information to the entry point tables so that the stream of audiovisual information does not directly have to be stored after the entry point table. Moreover, different additions to the method as described by means of the flow chart in FIG. 3 are of course alternatively possible. It is also possible to process information before it is stored on a record carrier. This, however, does not depart from the scope of the invention.

In FIG. 1, the circuit 100 is adapted to perform the method according to the invention. In a further embodiment of the invention, the method according to the invention is performed by means of a universal computing unit such as a personal computer. This is effected by programming a processing unit of the personal computer in such a way that it can perform the method according to the invention. The instructions for programming the processing unit are stored on a record carrier.

Figure 10A:
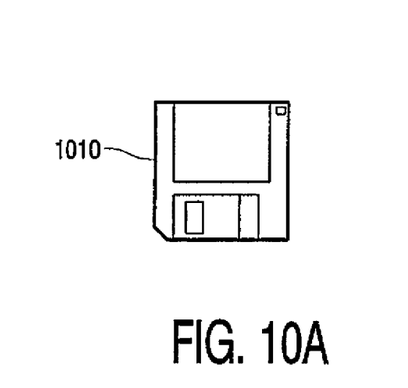
FIGS. 10A and 10B show an embodiment of the record carrier comprising computer-readable and executable instructions according to the invention, and a computer adapted to read and perform the instructions on the record carrier.
Figure 10B:
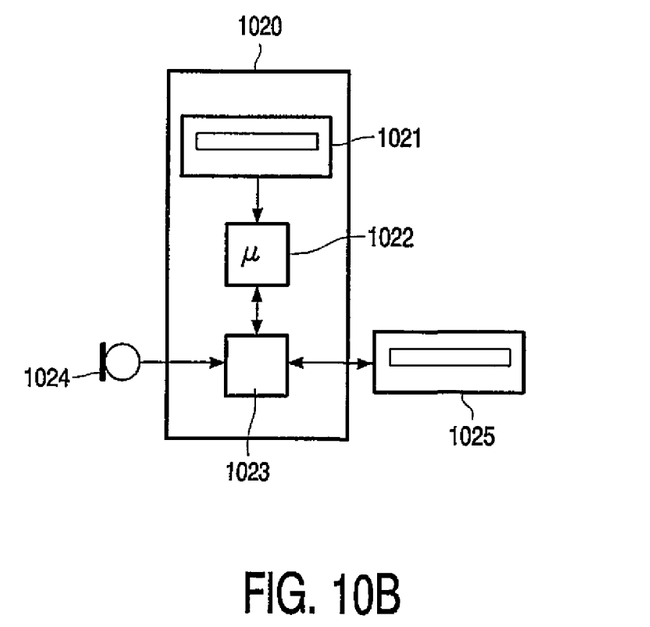

All this has been shown in FIG. 10A and FIG. 10B. FIG. 10A shows a floppy 1010 as an embodiment of the record carrier comprising computer-readable and executable instructions according to the invention. The floppy 1010 can be read by a personal computer 1020 by means of a floppy drive 1021. The instructions stored on the floppy 1010 are passed on via the floppy drive 1021 to a processing unit 1022 enabling the processing unit 1022 to perform the method according to the invention.

The processing unit 1022 controls a special signal-processing unit 1023. In the embodiment shown, the special signal-processing unit 1023 is further connected to a microphone 1024 and a writing unit 1025. In the embodiment shown, the writing unit 1025 is adapted to store information on an optical disc. It will be evident to those skilled in the art that this is not limitative to the scope of the invention, because different storage media may be used alternatively.

The microphone 1024 is adapted to convert a sound signal into an electric signal. This electric signal is processed by the special signal-processing unit 1023. One of these processing operations is the conversion of an analog signal to a digital signal, but this is not limitative. Entry points for the information are generated by means of the method according to the invention, using the processing unit 1022 and the special signal-processing unit 1023. An entry point table is also generated. Subsequently, the writing unit 1025 stores the information together with the entry point table on a record carrier.

In the embodiment described, the data stream to be stored on a record carrier is presented as a stream of audiovisual information. However, it will be evident to those skilled in the art that different data streams such as computer programs can be stored on the record carrier, which programs have been indexed by means of the method according to the invention.

In summary, the invention relates to a method and an apparatus for defining entry points for a data stream, in particular a stream of audiovisual information. Entry points in the stream are defined at a predetermined interval. This may be a time interval, a byte interval or any other interval. It is an object of the invention to provide an entry point table having a limited size. This object is achieved by increasing the interval between entry points if the table exceeds a predetermined size. This size may be defined in bytes, in the number of entry points or even in the number of sub-tables. After redefinition of the interval between entry points, entry points are redefined. The invention also relates to an apparatus for defining the entry points and to a record carrier with a data stream incorporating entry points defined by the method according to the invention.

The invention claimed is:

1. A method performed by at least one processor for defining entry points in an incoming data stream, the method comprising the acts of:
    the at least one processor generating an entry point table;
    defining a first interval;
    defining entry points in the incoming data stream, in which the entry points are defined at a distance from each other, equal to the first interval by storing entry point addresses giving the location of the defined entry points;
    storing the defined entry points in the entry point table;
    increasing the first interval between the entry points to a second interval in response to the size of the entry point table exceeding a set size; and,
    determining new entry points having a mutual distance which is equal to that of the second predetermined interval in response to the size of the entry point table exceeding the set size.

2. The method as claimed in claim 1, wherein the first interval and the second interval are time intervals.

3. The method as claimed in claim 1, wherein the second interval is chosen to be twice as large as the first predetermined interval.

4. The method as claimed in claim 1, wherein the maximum size of the entry point table is determined by the number of entry points.

5. The method as claimed in claim 1, wherein the maximum size of the entry point table is determined by its total size.

6. The method as claimed in claim 1, further comprising the act of:
    combining a first entry point table, associated with a first data stream, and a second entry point table, associated with a second data stream, for forming a third entry point table associated with a third data stream.

7. The method as claimed in claim 1, wherein the first interval equals a smallest data unit that can be defined in the incoming data stream.

8. The method as claimed in dam 1, wherein the incoming data stream is an incoming MPEG-2 data stream and the first interval equals a group of pictures in the incoming MPEG-2 data stream.

9. The method as claimed in claim 1, wherein the entry point table comprises an interval indicator indicating a length of the interval between two entry points.

10. The method as claimed in claim 1, wherein the entry points in the incoming data stream are defined at an equal distance from each other.

11. A method performed by at least one processor for splitting up a first data stream into a second data stream comprising the start of the first data stream, and a third data stream comprising the end of the first data stream, wherein a first entry point table incorporating a first group of entry points is defined for the first data stream, the method comprising the acts of:
    defining a first entry point table incorporating a first group of entry points;
    the at least one processor selecting a second group of entry points from the first group of entry points, in which the second group of entry points refers to locations in the second data stream;
    forming a second entry point table comprising the second group of entry points;
    selecting a third group of entry points from the first group of entry points, in which the third group of entry points refers to locations in the third data stream;
    forming a third entry point table comprising the third group of entry points;
    determining an interval between the start of the third stream of audiovisual information and a first entry point of the third data stream; and
    storing the interval, determined in the previous step, in the third entry point table, wherein the first entry point table defining act includes the acts of:
    generating an entry point table;
    defining a first interval;
    defining entry points in the incoming data stream, in which the entry points are defined at a distance from each other, equal to the first interval by storing entry point addresses giving the location of the defined entry points;
    storing the defined entry points in the entry point table;
    increasing the first interval between the entry points to a second interval in response to the size of the entry point table exceeding a set size; and,
    determining new entry points having a mutual distance which is equal to that of the second predetermined interval in response to the size of the entry point table exceeding the set size.

12. A non-transitory computer readable medium comprising one of an optical storage device, a hard disk, and a memory device, having stored therein computer-readable and executable instructions, wherein the instructions, when executed by a processor enable the computer to perform the acts of:
    defining a first interval;
    defining entry points in the incoming data stream, in which the entry points are defined at a distance from each other, equal to the first interval by storing entry point addresses giving the location of the defined entry points;
    storing the defined entry points in the entry point table;
    increasing the first interval between the entry points to a second interval in response to the size of the entry point table exceeding a set size; and,
    determining new entry points having a mutual distance which is equal to that of the second predetermined interval in response to the size of the entry point table exceeding the set size.

13. The non-transitory computer readable medium as claimed in dam 12, wherein the first interval equals a smallest data unit that can be defined in the incoming data stream.

14. The non-transitory computer readable medium as claimed in claim 12, wherein the incoming data stream is an incoming MPEG-2 data stream and the first interval equals a group of pictures in the incoming MPEG-2 data stream.

15. The non-transitory computer readable medium as claimed in claim 12, wherein the entry point table comprises an interval indicator indicating a length of the interval between two entry points.

16. The non-transitory computer readable medium as claimed in claim 12, wherein the entry points in the incoming data stream are defined at an equal distance from each other.

17. An apparatus adapted to define entry points in an incoming data stream, the apparatus comprising:
   a processor; and
   a memory for storing information used by the processor;
   wherein the processor is configured to:
   generate an entry point table;
   define a first interval;
   define entry points in the incoming data stream, in which the entry points are defined at a distance from each other, equal to the first interval by storing entry point addresses giving the location of the defined entry points;
   store the defined entry points in the entry point table;
   increase the first interval between the entry points to a second interval in response to a size of the entry point table exceeding a predetermined size; and,
   determine new entry points having a mutual distance which is equal to that of the second predetermined interval in response to the size of the entry point table exceeding the predetermined size.

18. The apparatus as claimed in claim 17, wherein the first interval equals a smallest data unit that can be defined in the incoming data stream.

19. The apparatus as claimed in claim 17, wherein the incoming data stream is an incoming MPEG-2 data stream and the first interval equals a group of pictures in the incoming MPEG-2 data stream.

20. The apparatus as claimed in claim 17, wherein the entry point table comprises an interval indicator indicating a length of the interval between two entry points.

21. The apparatus as claimed in claim 17, wherein the entry points in the incoming data stream are defined at an equal distance from each other.

\* \* \* \* \*